United States Patent
Hudson et al.

(10) Patent No.: US 11,552,482 B2
(45) Date of Patent: Jan. 10, 2023

(54) HYBRID CELL BALANCING FOR HIGH VOLTAGE BATTERY PACKS

(71) Applicant: Ford Global Technologies, LLC, Dearborn, MI (US)

(72) Inventors: Andrew Hudson, Sterling Heights, MI (US); Farouq Mozip, Dearborn, MI (US); John Anthony DeMarco, Lake Orion, MI (US); David Celinske, Wolverine Lake, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 480 days.

(21) Appl. No.: 16/684,749

(22) Filed: Nov. 15, 2019

(65) Prior Publication Data

US 2021/0151995 A1     May 20, 2021

(51) Int. Cl.
    *H02J 7/00*     (2006.01)

(52) U.S. Cl.
    CPC .......... *H02J 7/0016* (2013.01); *H02J 7/0021* (2013.01)

(58) Field of Classification Search
    CPC ....................................................... H02J 7/00
    See application file for complete search history.

(56) References Cited

U.S. PATENT DOCUMENTS

2013/0300371 A1* 11/2013 Bills .................. H02J 7/00
    320/134
2016/0336767 A1* 11/2016 Zane .................. H02J 7/0048

FOREIGN PATENT DOCUMENTS

| CN | 101888106 A | 11/2010 |
|---|---|---|
| CN | 102368628 B | 9/2013 |
| CN | 107359662 A | 11/2017 |
| CN | 207559607 U | 6/2018 |

* cited by examiner

*Primary Examiner* — Robert Grant
(74) *Attorney, Agent, or Firm* — David B. Kelley; Carlson, Gaskey & Olds, P.C.

(57) ABSTRACT

A method and an apparatus, according to an exemplary aspect of the present disclosure includes, among other things, a high voltage battery pack comprised of a least a first module comprised of a plurality of first battery cells, a second module comprised of a plurality of second battery cells, and a third module comprised of a plurality of third battery cells. A first passive battery management system monitors and balances the plurality of first battery cells, a second passive battery management system monitors and balances the plurality of second battery cells, and a third passive battery management system monitors and balances the plurality of third battery cells. A pack manager measures a voltage of each of the first, second, and third modules, compares measured voltages of the first, second, and third modules, and actively balances a lower charged module from the first, second, and third modules with energy from a higher charged module of the first, second, and third modules.

20 Claims, 2 Drawing Sheets

HYBRID CELL BALANCING FOR HIGH VOLTAGE BATTERY PACKS

TECHNICAL FIELD

This disclosure relates generally to a method and system that uses hybrid cell balancing for high voltage battery packs.

BACKGROUND

Electrified vehicles include a High Voltage Battery (HVB) and a Battery Management System (BMS). The HVB is made up from a plurality of battery cells. The BMS is used for diagnostic purposes and to maintain proper balancing between the cells. One type of cell balancing is referred to as passive balancing. This method uses transistors to switch a balancing resistor into or out of parallel with an individual cell. Overcharged cells are simply discharged and the energy is wasted as heat. Another type of cell balancing is referred to as active balancing. This method uses complex circuitry to charge an undercharged cell with an overcharged cell. Active balancing has increased cost and complexity compared to passive balancing.

SUMMARY

An apparatus according to an exemplary aspect of the present disclosure includes, among other things, a high voltage battery pack comprised of a least a first module comprised of a plurality of first battery cells, a second module comprised of a plurality of second battery cells, and a third module comprised of a plurality of third battery cells. A first passive battery management system monitors and balances the plurality of first battery cells, a second passive battery management system monitors and balances the plurality of second battery cells, and a third passive battery management system monitors and balances the plurality of third battery cells. A pack manager measures a voltage of each of the first, second, and third modules, compares measured voltages of the first, second, and third modules, and actively balances a lower charged module from the first, second, and third modules with energy from a higher charged module of the first, second, and third modules.

In a further non-limiting embodiment of the foregoing apparatus, the first, second, and third passive battery management systems respectively balance the first, second, and third battery cells by discharging energy of overcharged cells in the form of heat.

In a further non-limiting embodiment of any of the foregoing apparatus, the pack manager balances the first, second, and third modules using a linear or ladder charging of modules.

In a further non-limiting embodiment of any of the foregoing apparatus, the second module is between the first and third modules such that if energy from the third module is too low and energy from the first module is high, the pack manager first uses energy from the second module to charge the third module, and then uses energy from the first module to charge the second module such that the energy is balanced between the first, second and third modules.

In a further non-limiting embodiment of any of the foregoing apparatus, wherein if energy from the first module is too low and energy from the third module is high, the pack manager first uses energy from the second module to charge the first module, and then uses energy from the third module to charge the second module such that the energy is balanced between the first, second and third modules.

In a further non-limiting embodiment of any of the foregoing apparatus, each module includes a switch, and wherein the pack manager measures and determines a differential voltage for each of the first, second, and third modules such that there is a first differential voltage, a second differential voltage, and a third differential voltage, and wherein the pack manager compares the first, second, and third differential voltages to each other to determine differences in module voltages, determines a duty cycle proportional to the difference, and generates a pulse width modulation signal at the duty cycle to control the switches for charge shuttling circuits to transfer energy between the first, second and third modules.

In a further non-limiting embodiment of any of the foregoing apparatus, the switches are MOSFET switches, and wherein when the second module is used to charge the first module, the MOSFET switch from the second module conducts current from a positive of the second module to a negative of the second module through a primary coil of an isolation transformer of the charge shuttling circuit for the second module to create an AC voltage that is conducted across a barrier of the isolation transformer to a secondary coil, and wherein the AC voltage is rectified with at least one rectifier diode before being fed to the first module.

An apparatus, according to yet another exemplary aspect of the present disclosure includes, among other things, a high voltage battery pack comprised of a least a first module comprised of a plurality of first battery cells, a second module comprised of a plurality of second battery cells, and a third module comprised of a plurality of third battery cells, and wherein the second module is between the first and third modules. A first passive battery management system monitors and balances the plurality of first battery cells, a second passive battery management system monitors and balances the plurality of second battery cells, and a third passive battery management system monitors and balances the plurality of third battery cells. A pack manager measures a voltage of each of the first, second, and third modules, compares measured voltages of the first, second, and third modules, and actively balances a lower charged module from the first, second, and third modules with energy from a higher charged module of the first, second, and third modules. The pack manager balances the first, second, and third modules using a linear or ladder charging of modules such that if energy from the third module is too low and energy from the first module is high, the pack manager first uses energy from the second module to charge the third module, and then uses energy from the first module to charge the second module such that the energy is balanced between the first, second and third modules.

In a further non-limiting embodiment of any of the foregoing apparatus, wherein if energy from the first module is too low and energy from the third module is high, the pack manager first uses energy from the second module to charge the first module, and then uses energy from the third module to charge the second module such that the energy is balanced between the first, second and third modules.

In a further non-limiting embodiment of any of the foregoing apparatus, the first, second, and third passive battery management systems respectively balance the first, second, and third battery cells by discharging energy of overcharged cells in the form of heat.

In a further non-limiting embodiment of any of the foregoing apparatus, each module includes a switch, and wherein the pack manager measures and determines a differential voltage for each of the first, second, and third modules such that there is a first differential voltage, a second differential voltage, and a third differential voltage, and wherein the pack manager compares the first, second, and third differential voltages to each other to determine differences in module voltages, determines a duty cycle proportional to the difference, and generates a pulse width modulation signal at the duty cycle to control the switches for charge shuttling circuits to transfer energy between the first, second and third modules.

In a further non-limiting embodiment of any of the foregoing apparatus, the switches are MOSFET switches, and wherein each module includes an isolation transformer and at least one rectifier diode.

In a further non-limiting embodiment of any of the foregoing apparatus, wherein when the second module is used to charge the first module, the MOSFET switch from the second module conducts current from a positive of the second module to a negative of the second module through a primary coil of the isolation transformer of the charge shuttling circuit for the second module to create an AC voltage that is conducted across a barrier of the isolation transformer to a secondary coil, and wherein the AC voltage is rectified with the rectifier diode before being fed to the first module.

A method according to still another exemplary aspect of the present disclosure includes, among other things, providing a high voltage battery pack comprised of a least a first module comprised of a plurality of first battery cells, a second module comprised of a plurality of second battery cells, and a third module comprised of a plurality of third battery cells; monitoring and balancing the plurality of first battery cells with a first passive battery management system; monitoring and balancing the plurality of second battery cells with a second passive battery management system; monitoring and balancing the plurality of third battery cells with a third passive battery management system; and measuring a voltage of each of the first, second, and third modules with a pack manager that compares measured voltages of the first, second, and third modules, and actively balances a lower charged module from the first, second, and third modules with energy from a higher charged module of the first, second, and third modules.

In a further non-limiting embodiment of the foregoing method, the first, second, and third passive battery management systems respectively balance the first, second, and third battery cells by discharging energy of overcharged cells in the form of heat.

In a further non-limiting embodiment of any of the foregoing methods, the pack manager balances the first, second, and third modules using a linear or ladder charging of modules.

In a further non-limiting embodiment of any of the foregoing methods, the second module is between the first and third modules such that if energy from the third module is too low and energy from the first module is high, the pack manager first uses energy from the second module to charge the third module, and then uses energy from the first module to charge the second module such that the energy is balanced between the first, second and third modules.

In a further non-limiting embodiment of any of the foregoing methods, wherein if energy from the first module is too low and energy from the third module is high, the pack manager first uses energy from the second module to charge the first module, and then uses energy from the third module to charge the second module such that the energy is balanced between the first, second and third modules.

In a further non-limiting embodiment of any of the foregoing methods, each module includes a switch, and wherein the pack manager measures and determines a differential voltage for each of the first, second, and third modules such that there is a first differential voltage, a second differential voltage, and a third differential voltage, and wherein the pack manager compares the first, second, and third differential voltages to each other to determine differences in module voltages, determines a duty cycle proportional to the difference, and generates a pulse width modulation signal at the duty cycle to control the switches for charge shuttling circuits to transfer energy between the first, second and third modules.

In a further non-limiting embodiment of any of the foregoing methods, the switches are MOSFET switches, and wherein when the second module is used to charge the first module, the MOSFET switch from the second module conducts current from a positive of the second module to a negative of the second module through a primary coil of an isolation transformer of the charge shuttling circuit for the second module to create an AC voltage that is conducted across a barrier of the isolation transformer to a secondary coil, and wherein the AC voltage is rectified with at least one rectifier diode before being fed to the first module.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

BRIEF DESCRIPTION OF THE FIGURES

The various features and advantages of the disclosed examples will become apparent to those skilled in the art from the detailed description. The figures that accompany the detailed description can be briefly described as follows.

DETAILED DESCRIPTION

This disclosure details, among other things, an exemplary method and system that uses hybrid cell balancing for high voltage battery packs.

Figure 1:
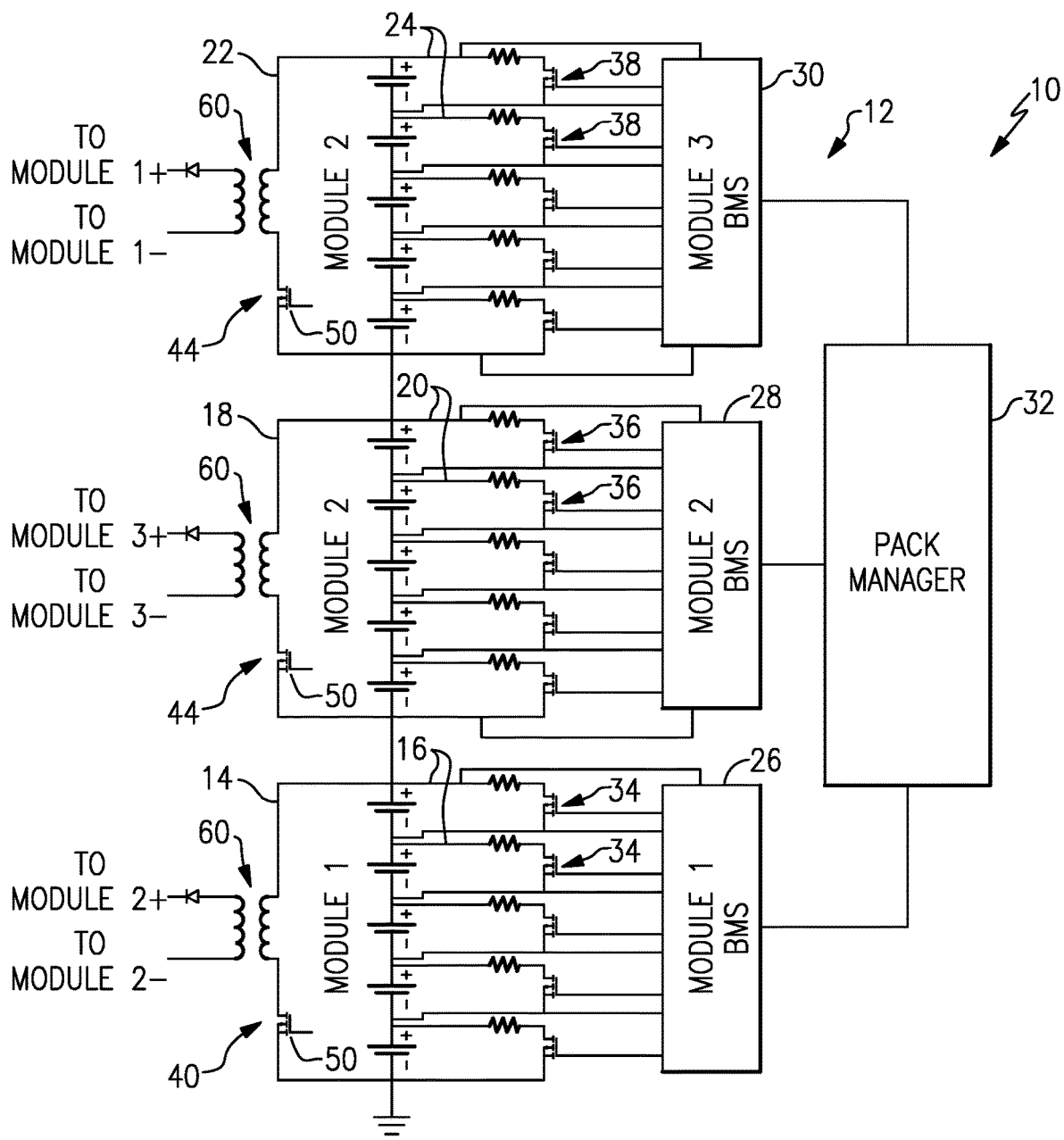
FIG. 1 illustrates a schematic diagram of a hybrid cell balancing system for a high voltage battery pack.

With reference to FIG. 1, a balancing system 10 includes a high voltage battery pack 12 for an electrified vehicle such as a hybrid electric vehicle (HEV), plug-in electric vehicle (PEV), battery electric vehicle (BEV), etc., for example. The battery pack 12 is comprised of a least a first module 14 comprised of a plurality of first battery cells 16, a second module 18 comprised of a plurality of second battery cells 20, and a third module 22 comprised of a plurality of third battery cells 24. In one example, the modules 14, 18, 22 are arranged in a sequential order with the second module 18 being located between the first 14 and third 22 modules.

The modules 14, 18, 22 are typically made up of precision matched cells from the same production batch, so that the individual cells 16, 20, 24 within the respective module 14, 18, 22 are almost identical to each other. A first passive battery management system 26 is used monitor and balance the plurality of first battery cells 16. A second passive battery management system 28 is used to monitor and balance the plurality of second battery cells 20. A third passive battery management system 30 is used to monitor and balance the plurality of third battery cells 24. In one example, each of the first 26, second 28, and third 30 passive battery management systems uses a plurality of transistors to switch a balancing resistor (not shown) into or out of parallel to a respective individual battery cell 16, 20, 24, which discharges an overcharged cell in the form of heat as known. Thus, the passive battery management systems 26, 28, 30 operate efficiently to monitor and balance cells within an individual module.

The balancing system 10 includes a pack manager 32 to actively monitor and provide balancing between the modules 14, 18, 22. The pack manager 32 measures a voltage of each of the first 14, second 18, and third 22 modules, and then compares the measured voltages of the modules 14, 18, 22. The pack manager 32 actively balances a lower charged module from the first 14, second 18, and third 22 modules with energy from a higher charged module of the first 14, second 18, and third 22 modules. The pack manager 32 balances the first 14, second 18, and third 22 modules using a linear or ladder charging of modules such that if energy from the third module 22 is too low and energy from the first module 14 is high, the pack manager 32 first uses energy from the second module 18 to charge the third module 22, and then uses energy from the first module 14 to charge the second module 18 such that the energy is balanced between the first 14, second 18, and third 22 modules. Also, for example, if energy from the first module 14 is too low and energy from the third module 22 is high, the pack manager 32 first uses energy from the second module 18 to charge the first module 14, and then uses energy from the third module 22 to charge the second module 18 such that the energy is balanced between the first 14, second 18, and third 22 modules. This ladder charging process is less complex and is more cost effective than traditional active balancing systems.

Each of the battery cells 16, 20, 24 includes a positive and negative terminal and resistor as shown. Further, each of the first battery cells 16 includes an electrical connector 34 to connect to the first passive battery management system 26, each of the second battery cells 20 includes an electrical connector 36 to connect to the second passive battery management system 28, and each of the third battery cells 24 includes an electrical connector 38 to connect to the third passive battery management system 30. The first module 14 includes an electrical connector 40 to the pack manager 32, the second module 18 includes an electrical connector 42 to the pack manager 32, and the third module 22 includes an electrical connector 44 to the pack manager 32. In one example, the connectors 40, 42, 44 comprise switches that will be discussed in greater detail below.

The passive battery management systems 26, 28, 30 and the pack manager 32 include one or more electronic controllers as needed to balance the cells and the modules. The controllers can include a processor, memory, and one or more input and/or output device interface(s) that are communicatively coupled via a local interface. In one example, the pack manager 32 includes the components necessary to measure an individual module's differential voltage, compare that individual module's voltage with the differential voltage of a neighboring module, determine an appropriate duty cycle proportional to the difference in module voltages, and generate a signal to control charging between the modules.

Figure 2:
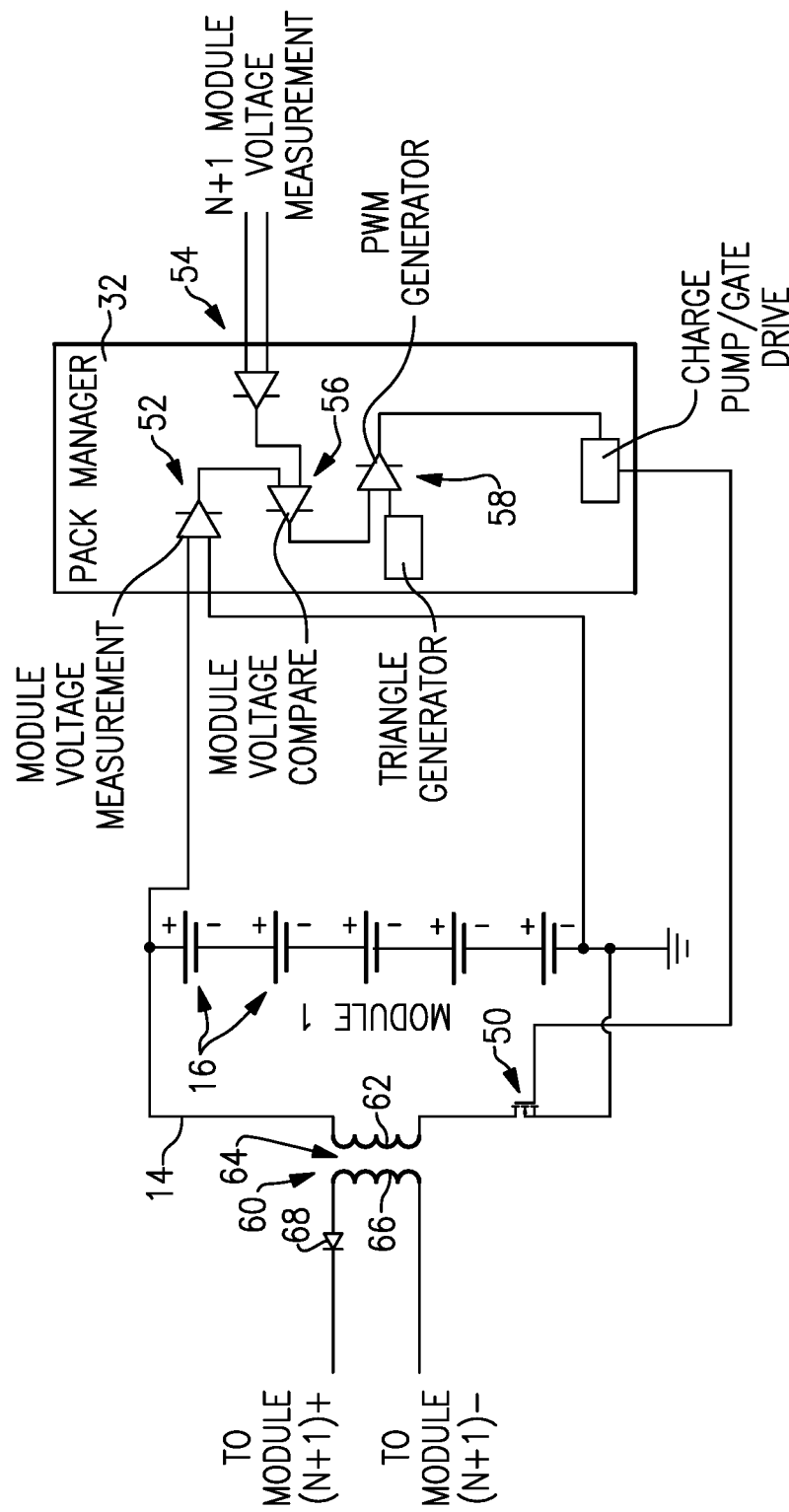
FIG. 2 is a schematic diagram of a pack manager and one module from the system of FIG. 1.

As shown in FIG. 2, each module includes a switch 50. In one example, the switches 50 are Metal Oxide Semiconductor Field Effect Transistor (MOSFET) switches 50. As discussed above, the pack manager 32 measures and determines a differential voltage for each of the first 14, second 18, and third 22 modules such that there is a first differential voltage, a second differential voltage, and a third differential voltage. In the example shown in FIG. 2, the pack manager 32 measures the differential voltage for the first module 14, as indicated at 52, measures a neighboring module's differential voltage as indicated at 54, and then compares them to each other as indicated at 56 to determine differences in module voltages. The pack manager 32 then determines a duty cycle proportional to the identified difference, and generates a pulse width modulation (PWM) signal (see 58 in FIG. 2) at the duty cycle to control the switches 50 for charge shuttling circuits 60 to transfer energy between the modules.

In one example, when one module is used to charge another module, the MOSFET switch 50 from the one module conducts current from a positive of the one module to a negative of the one module through a primary coil 62 of an isolation transformer 64 of the charge shuttling circuit 60 for the one module to create an AC voltage that is conducted across a barrier of the isolation transformer 64 to a secondary coil 66. The isolated AC voltage is then rectified with at least one rectifier diode 68 before being fed to the under-charged module.

There is always a need to increase the useable range of electrified vehicles that utilize a HV battery pack 12. As discussed above, the HV battery pack 12 includes individual battery cells that are grouped to form modules that include a battery management system. The battery management systems report specific diagnostic information to the vehicle as it pertains to the battery's temperature, voltage, and current. Also, the battery management systems ensure proper balance is maintained between the cells of the HV battery pack 12. This avoids overcharging and increases the life of the HV battery pack 12.

The subject disclosure uses a traditional passive battery management system to monitor and balance the matched cells within a particular module, in combination with a pack manager that measures and compares voltages from each module to determine if and when a particular charge shuttling circuit is activated to provide balancing between modules. This avoids the complexity and cost of traditional active balancing systems while also significantly reducing module-to-module differences in internal resistance and capacitance. Thus, the subject disclosure leverages the advantages of matched cells within a module to derive a system that provides highly efficient charge shuttling only where needed in order to produce a pack manager that maximizes HV battery capacity while maintaining the lower cost and complexity of a passive system.

Although a specific component relationship is illustrated in the figures of this disclosure, the illustrations are not intended to limit this disclosure. In other words, the placement and orientation of the various components shown could vary within the scope of this disclosure. In addition, the various figures accompanying this disclosure are not necessarily to scale, and some features may be exaggerated or minimized to show certain details of a particular component.

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

What is claimed is:

1. A system, comprising:
a high voltage battery pack comprised of a least a first module comprised of a plurality of first battery cells, a second module comprised of a plurality of second battery cells, and a third module comprised of a plurality of third battery cells;
a first passive battery management system to monitor and balance the plurality of first battery cells;
a second passive battery management system to monitor and balance the plurality of second battery cells;
a third passive battery management system to monitor and balance the plurality of third battery cells; and
a pack manager that measures a voltage of each of the first, second, and third modules, compares measured voltages of the first, second, and third modules, and actively balances a lower charged module from the first, second, and third modules with energy from a higher charged module of the first, second, and third modules.

2. The system according to claim 1, wherein the first, second, and third passive battery management systems respectively balance the first, second, and third battery cells by discharging energy of overcharged cells in the form of heat.

3. The system according to claim 1, wherein the pack manager balances the first, second, and third modules using a linear or ladder charging of modules.

4. The system according to claim 3, wherein the second module is between the first and third modules such that if energy from the third module is too low and energy from the first module is high, the pack manager first uses energy from the second module to charge the third module, and then uses energy from the first module to charge the second module such that the energy is balanced between the first, second and third modules.

5. The system according to claim 4, wherein if energy from the first module is too low and energy from the third module is high, the pack manager first uses energy from the second module to charge the first module, and then uses energy from the third module to charge the second module such that the energy is balanced between the first, second and third modules.

6. The system according to claim 1, wherein each module includes a switch, and wherein the pack manager measures and determines a differential voltage for each of the first, second, and third modules such that there is a first differential voltage, a second differential voltage, and a third differential voltage, and wherein the pack manager
compares the first, second, and third differential voltages to each other to determine differences in module voltages,
determines a duty cycle proportional to the difference, and
generates a pulse width modulation signal at the duty cycle to control the switches for charge shuttling circuits to transfer energy between the first, second and third modules.

7. The system according to claim 6, wherein the switches are MOSFET switches, and wherein when the second module is used to charge the first module, the MOSFET switch from the second module conducts current from a positive of the second module to a negative of the second module through a primary coil of an isolation transformer of the charge shuttling circuit for the second module to create an AC voltage that is conducted across a barrier of the isolation transformer to a secondary coil, and wherein the AC voltage is rectified with at least one rectifier diode before being fed to the first module.

8. A system, comprising:
a high voltage battery pack comprised of a least a first module comprised of a plurality of first battery cells, a second module comprised of a plurality of second battery cells, and a third module comprised of a plurality of third battery cells, and wherein the second module is between the first and third modules;
a first passive battery management system to monitor and balance the plurality of first battery cells;
a second passive battery management system to monitor and balance the plurality of second battery cells;
a third passive battery management system to monitor and balance the plurality of third battery cells; and
a pack manager that measures a voltage of each of the first, second, and third modules, compares measured voltages of the first, second, and third modules, and actively balances a lower charged module from the first, second, and third modules with energy from a higher charged module of the first, second, and third modules, and wherein the pack manager balances the first, second, and third modules using a linear or ladder charging of modules such that if energy from the third module is too low and energy from the first module is high, the pack manager first uses energy from the second module to charge the third module, and then uses energy from the first module to charge the second module such that the energy is balanced between the first, second and third modules.

9. The system according to claim 8, wherein if energy from the first module is too low and energy from the third module is high, the pack manager first uses energy from the second module to charge the first module, and then uses energy from the third module to charge the second module such that the energy is balanced between the first, second and third modules.

10. The system according to claim 9, wherein the first, second, and third passive battery management systems respectively balance the first, second, and third battery cells by discharging energy of overcharged cells in the form of heat.

11. The system according to claim 10, wherein each module includes a switch, and wherein the pack manager measures and determines a differential voltage for each of the first, second, and third modules such that there is a first differential voltage, a second differential voltage, and a third differential voltage, and wherein the pack manager
compares the first, second, and third differential voltages to each other to determine differences in module voltages,
determines a duty cycle proportional to the difference, and
generates a pulse width modulation signal at the duty cycle to control the switches for charge shuttling circuits to transfer energy between the first, second and third modules.

12. The system according to claim 11, wherein the switches are MOSFET switches, and wherein each module includes an isolation transformer and at least one rectifier diode.

13. The system according to claim 12, wherein, when the second module is used to charge the first module, the MOSFET switch from the second module conducts current from a positive of the second module to a negative of the second module through a primary coil of the isolation transformer of the charge shuttling circuit for the second module to create an AC voltage that is conducted across a barrier of the isolation transformer to a secondary coil, and wherein the AC voltage is rectified with the rectifier diode before being fed to the first module.

14. A method comprising:
    providing a high voltage battery pack comprised of a least a first module comprised of a plurality of first battery cells, a second module comprised of a plurality of second battery cells, and a third module comprised of a plurality of third battery cells;
    monitoring and balancing the plurality of first battery cells with a first passive battery management system;
    monitoring and balancing the plurality of second battery cells with a second passive battery management system;
    monitoring and balancing the plurality of third battery cells with a third passive battery management system; and
    measuring a voltage of each of the first, second, and third modules with a pack manager that compares measured voltages of the first, second, and third modules, and actively balances a lower charged module from the first, second, and third modules with energy from a higher charged module of the first, second, and third modules.

15. The method according to claim 14, wherein the first, second, and third passive battery management systems respectively balance the first, second, and third battery cells by discharging energy of overcharged cells in the form of heat.

16. The method according to claim 15, wherein the pack manager balances the first, second, and third modules using a linear or ladder charging of modules.

17. The method according to claim 16, wherein the second module is between the first and third modules such that if energy from the third module is too low and energy from the first module is high, the pack manager first uses energy from the second module to charge the third module, and then uses energy from the first module to charge the second module such that the energy is balanced between the first, second and third modules.

18. The method according to claim 17, wherein if energy from the first module is too low and energy from the third module is high, the pack manager first uses energy from the second module to charge the first module, and then uses energy from the third module to charge the second module such that the energy is balanced between the first, second and third modules.

19. The method according to claim 16, wherein each module includes a switch, and wherein the pack manager measures and determines a differential voltage for each of the first, second, and third modules such that there is a first differential voltage, a second differential voltage, and a third differential voltage, and wherein the pack manager
    compares the first, second, and third differential voltages to each other to determine differences in module voltages,
    determines a duty cycle proportional to the difference, and
    generates a pulse width modulation signal at the duty cycle to control the switches for charge shuttling circuits to transfer energy between the first, second and third modules.

20. The method according to claim 19, wherein the switches are MOSFET switches, and wherein when the second module is used to charge the first module, the MOSFET switch from the second module conducts current from a positive of the second module to a negative of the second module through a primary coil of an isolation transformer of the charge shuttling circuit for the second module to create an AC voltage that is conducted across a barrier of the isolation transformer to a secondary coil, and wherein the AC voltage is rectified with at least one rectifier diode before being fed to the first module.

* * * * *